(No Model.)
J. A. HITTER.
PROCESS OF AND APPARATUS FOR TREATING FIBROUS PLANTS.
No. 300,778. Patented June 24, 1884.
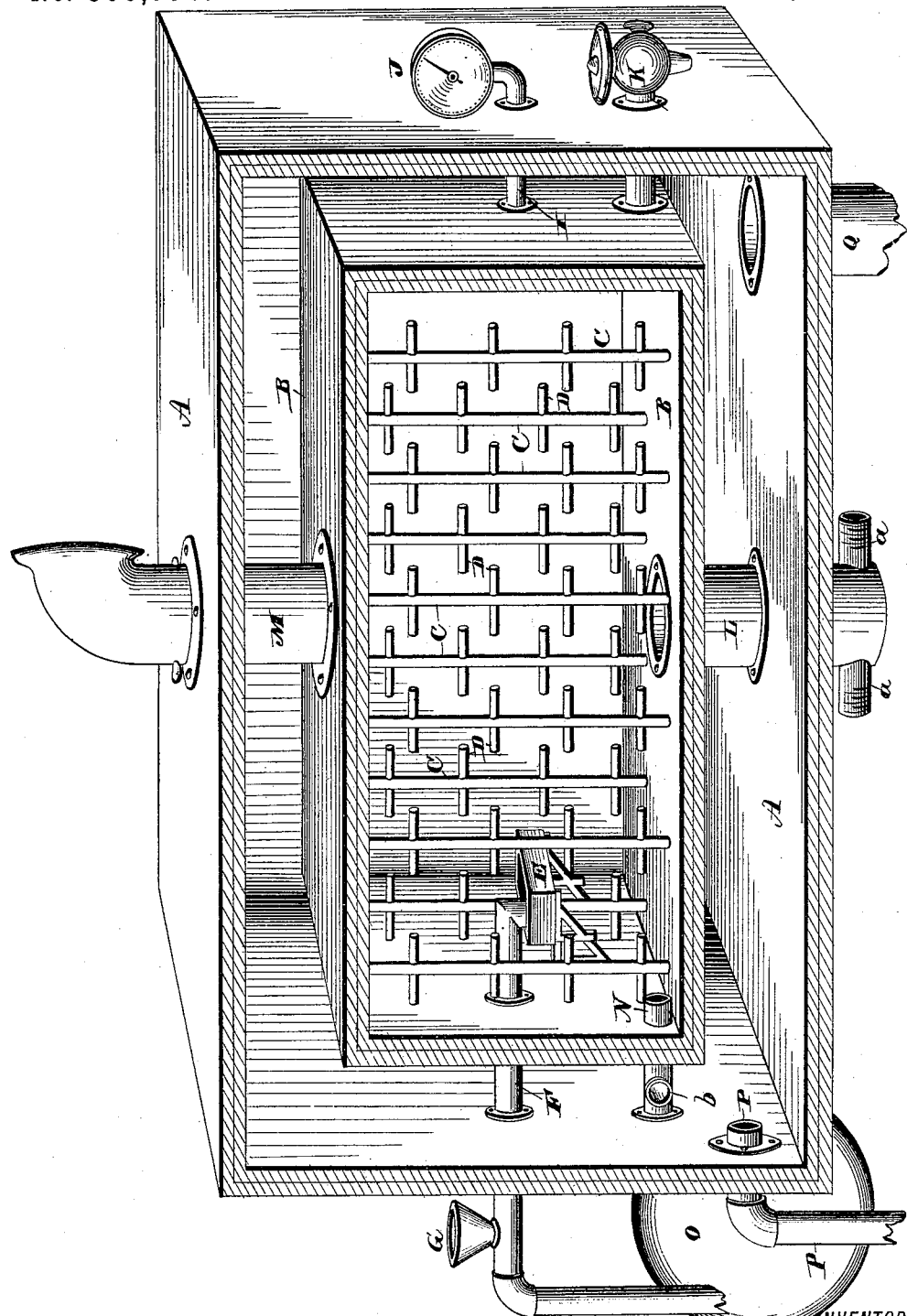
WITNESSES
Geo. F. Downing.
George Cook
INVENTOR
J. A. Hitter
By H. A. Seymour
Attorney

UNITED STATES PATENT OFFICE.

J. ALFRED HITTER, OF ST. MARTINSVILLE, LOUISIANA, ASSIGNOR TO MARIE B. HITTER, OF SAME PLACE.

PROCESS OF AND APPARATUS FOR TREATING FIBROUS PLANTS.

SPECIFICATION forming part of Letters Patent No. 300,778, dated June 24, 1884.

Application filed February 7, 1884. (No model.)

*To all whom it may concern:*

Be it known that I, J. ALFRED HITTER, of St. Martinsville, in the parish of St. Martin and State of Louisiana, have invented certain new and useful Improvements in Process of and Apparatus for Treating Fibrous Plants; and I do hereby declare the following to be a full, clear, and exact description of the invention, such as will enable others skilled in the art to which it appertains to make and use the same.

My invention relates to an improved process of and apparatus for treating vegetable fibers—such as moss, jute, ramie, &c.—the object being to provide improved means for preparing such growths for use in the arts; and it consists, first, in subjecting the fibrous plant to the action of breakers or rollers, then to the action of steam saturated with certain chemicals, and then drying or bleaching process.

My invention further consists in two steam-tight chambers—one within the other, the inner chamber being provided with vertical posts and cross-bars secured thereto—of a chemical-reservoir, and an induction steam-pipe terminating therein.

My invention further consists in certain details of construction and combinations of parts, as will be hereinafter described, and pointed out in the claims.

The drawing represents a perspective view of my improvement partly in section.

A represents a steam-tight casing, built of any desired material and size, and sufficiently strong to withstand a great amount of steam-pressure. Within this chamber or casing A is placed the inner chamber, B, made of strong material, and smaller in dimensions than the chamber A, leaving a space between the walls of the two casings, the two said casings being provided with steam-tight doors. (Not shown.)

In the interior of the chamber B are the vertical posts C, preferably placed at regular intervals apart to allow the employés to walk among them without difficulty. To the posts C are secured the cross-pieces D, on which the moss is loosely spread when ready for treatment. To one side of the internal chamber, B, is secured the reservoir E, in which terminates the steam-pipe F, leading from a boiler through the walls of the two chambers. To this pipe, outside of the chamber A, is secured a funnel, G, and a faucet, H, by means of which the reservoir E may be filled from the outside. From the opposite side of the chamber B leads the steam-pipe I, on the outer end of which is secured the gage J, adapted to indicate the pressure of steam in the said chamber B. On the same side of the internal chamber, and on a level with the floor thereof, is an indicator, K, through which, when opened, small pieces of the moss or other fibrous material are forced, which disclose the state or condition of the moss being treated.

L represents an exhaust-pipe leading from the internal chamber, B, through the outer chamber, A, and terminating in two vents, a, provided with an external screw-thread, adapting it to be coupled with a hose-pipe when it is desired to save the condensed liquids of the chamber B. From the ceiling of the inner chamber leads the pipe M, which is adapted to ventilate the said chamber, the ventilation being controlled by a valve within the pipe.

N represents a pipe leading to the internal chamber, B, and provided with an opening, b, between the walls of the inner and outer chambers, the said pipe leading from a fan inclosed within the casing O. This pipe is adapted to convey a current of fresh air from the fan to the inner and outer chambers when desired. Below this pipe is a pipe, P, leading from a boiler, and adapted to convey steam to the space between the inner and outer chambers, an exhaust, Q, leading from the latter, being adapted to carry the same away.

Having described the construction of my apparatus, I will now set forth its operation.

The moss or other fibrous plant is first passed through breakers or rollers, which crushes all unfit green ends, removes the dirt and foreign substances, when it is loosely spread over the cross-pieces D in the central chamber, and the doors closed tightly. The chemical preparation is then poured in the reservoir through the funnel G, and the steam then admitted through the pipe F. The chemical preparation preferably consists of a solution of sulphate of iron, which lightly burns or removes the white pellicle which covers the moss and increases the natural brilliant black color of the fiber. For jute and ramie, a solution of detergent alkali with boracic acid removes the gluten and produces a good result, the solution being strengthened, when desired, by the addition of sulphuric acid. When sulphate of iron is used, nut-galls finely powdered with a small quantity may be added, which gives the fiber the desired color. When the steam is admitted through the pipe F, it dilutes the chemical preparation in the reservoir, and, filling the interior chamber, forces out the small broken pieces of moss through the indicator K, by which the condition of the moss within the chamber is ascertained. After the fiber has been thus exposed the proper length of time, the steam is allowed to pass out through the exhaust L and ventilator M, after which soft soap is introduced in the reservoir, and steam admitted, as before, for neutralizing the acid and thoroughly washing the fiber. After this operation, the exhaust and ventilator are again opened, the fan put in motion to throw a current of fresh air through the chamber, and steam admitted between the two chambers, which has the effect of thoroughly drying the contents of the inner chamber. The fibrous material is then removed, and, when desired, subjected to the action of combers, which removes all the remaining impurities.

It is evident that many slight changes in the construction and relative arrangement of the different parts might be resorted to without departing from the spirit of my invention, and hence I would have it understood that I do not limit myself to the exact construction shown and described, but consider myself at liberty to make such changes both in the apparatus and process as fairly fall within the spirit and scope of my invention.

Having fully described my invention, what I claim as new, and desire to secure by Letters Patent, is—

1. An apparatus for treating fibrous material, consisting of a chamber provided with means for suspending the material therein, and of a reservoir for holding a chemical preparation, and having an induction steam-pipe terminating therein, the said chamber being also provided with an exhaust-pipe and an indicator.

2. In an apparatus for treating fibrous material, the combination, with a chamber provided with means for suspending the fiber therein, of a reservoir adapted to hold a chemical preparation, an induction steam-pipe terminating in said reservoir, an exhaust, an indicator, and a ventilator, substantially as set forth.

3. In an apparatus for treating fibrous material, the combination, with an external chamber, of a smaller chamber located therein, and provided with means for suspending the fibrous material, a reservoir situated within the said internal chamber, a steam-pipe terminating within the reservoir, an exhaust, and an indicator, substantially as set forth.

4. In an apparatus for treating fibrous material, the combination, with an outer chamber provided with induction and eduction steam-pipes, of an inner chamber provided with means for suspending the fibrous material, a reservoir, an induction steam-pipe terminating therein, an exhaust leading from the said inner chamber, an indicator, and a ventilator, substantially as set forth.

5. In an apparatus for treating fibrous material, the combination, with an outer chamber provided with induction and eduction steam-pipes, of an interior chamber provided with means for suspending the fibrous material, said interior chamber being provided with a reservoir adapted to contain a chemical preparation, an induction steam-pipe terminating in the reservoir, and provided with a faucet and funnel without the outer chamber, an exhaust leading from the inner chamber, an indicator, a steam-gage, a ventilator, and a pipe leading from a fan to the inner chamber and provided with an opening and valve between the walls of the two chambers, substantially as set forth.

6. A process of treating fibrous material, consisting in first subjecting the material to the action of rollers or breakers, then loosely suspending the same in a steam-tight chamber and subjecting it to the action of steam impregnated with chemical solutions, substantially as set forth.

7. A process of treating fibrous material, consisting in first subjecting the material to the action of rollers or breakers, then loosely suspending the same in a steam-tight chamber and subjecting it to the action of steam after the latter has passed through a solution of sulphate of iron, then to the action of steam after the latter has passed through soft soap, and then dried, substantially as set forth.

In testimony whereof I have signed this specification in the presence of two subscribing witnesses.

J. ALFRED HITTER.

Witnesses:
ALCIBIADE DE BLANC,
CARLOS GREIG.